United States Patent [19]

Morris et al.

[11] Patent Number: 4,904,747
[45] Date of Patent: Feb. 27, 1990

[54] BLENDS OF POLYCARBONATES WITH POLYESTERS FROM 4,4'-BIPHENYLDICARBOXYLIC ACID AND 1,6-HEXANEDIOL

[75] Inventors: John C. Morris; Winston J. Jackson, Jr., both of Kingston, Tenn.

[73] Assignee: Eastman Kodak Company, Rochester, N.Y.

[21] Appl. No.: 288,896

[22] Filed: Dec. 23, 1988

[51] Int. Cl.$^4$ .............................. C08F 20/00
[52] U.S. Cl. ................... 525/439; 528/272; 528/300; 528/302; 528/308; 525/419; 525/437; 525/444; 525/466
[58] Field of Search .............. 528/272, 300, 302, 308; 525/419, 437, 444, 439, 466

[56] References Cited

U.S. PATENT DOCUMENTS

| | | | |
|---|---|---|---|
| 2,657,194 | 10/1953 | Butler et al. | 528/301 |
| 2,657,195 | 10/1953 | Toland, Jr. | 528/304 |
| 2,976,266 | 3/1961 | Lytton et al. | 528/280 |
| 3,218,372 | 8/1961 | Okamura et al. | 525/439 |
| 3,247,043 | 4/1966 | Cardina | 156/314 |
| 3,496,839 | 2/1970 | Hartle | 525/165 |
| 3,842,040 | 10/1974 | Browne et al. | 528/364 |
| 3,842,041 | 10/1974 | Browne et al. | 528/274 |
| 3,909,489 | 9/1975 | Callander | 524/405 |
| 4,073,777 | 2/1978 | O'Neill et al. | 528/299 |
| 4,088,709 | 5/1978 | Seymour et al. | 524/151 |
| 4,125,571 | 11/1978 | Scott et al. | 524/449 |
| 4,188,314 | 2/1980 | Fox et al. | 524/494 |
| 4,420,607 | 12/1983 | Morris et al. | 528/298 |
| 4,452,933 | 6/1984 | McCready | 524/217 |
| 4,459,402 | 7/1984 | Morris et al. | 528/298 |
| 4,468,510 | 8/1984 | Morris et al. | 528/298 |
| 4,526,822 | 7/1985 | Morris et al. | 428/35 |
| 4,619,976 | 10/1986 | Morris et al. | 525/439 |
| 4,645,802 | 2/1987 | Jackson, Jr. et al. | 525/419 |

FOREIGN PATENT DOCUMENTS 7234874 7/1974 Japan.

OTHER PUBLICATIONS

Derwent Abstract: 3146136: JP 57198726.
Meurisse, et al., British Polymer Journal, vol. 13, 1981, p. 57 (Table 1) Jackson and Morris, Journal of Applied Polymer Science, Applied Polymer Symposium, 41, 307–326 (1985).
Krigbaum, et al., Journal of Applied Polymer Science, Polymer Letters Edition, 20, 109–115 (1982).
U.S. Ser. No. 288,985, filed Dec. 23, 1988, by Morris et al., entitled "Blends of Polycarbonates with Polyesters from 4,4'-Biphenyldicarboxylic Acid and 1,6-Hexanediol".

*Primary Examiner*—John Kight
*Assistant Examiner*—Samuel A. Acquah
*Attorney, Agent, or Firm*—John F. Stevens; William P. Heath, Jr.

[57] ABSTRACT

Disclosed are compositions of matter characterized by having improved tensile strength comprising a blend of
(a) about 30–95 weight % of a polyester containing repeating units from biphenyldicarboxylic acid 1,6-hexanediol, and
(b) about 70–5 weight % of a polycarbonate of 4,4'-isopropylidenediphenol.

10 Claims, No Drawings

BLENDS OF POLYCARBONATES WITH POLYESTERS FROM 4,4'-BIPHENYLDICARBOXYLIC ACID AND 1,6-HEXANEDIOL

TECHNICAL FIELD

This invention relates to blends of polycarbonates with certain polyesters which are especially useful as films, fibers, and molding plastics. This invention is particularly concerned with blends of polycarbonates with polyesters of 4,4'-biphenyldicarboxylic acid and 1,6-hexanediol.

BACKGROUND OF THE INVENTION

Of particular interest in U.S. Pat. No. 2,976,266. Copolyesters of 4,4'-biphenyldicarboxylic acid (BDA) and aliphatic glycols are disclosed and 1,6-hexanediol (HD) is specifically disclosed in Column 2, line 70 of U.S. 2,976,266.

Homopolyesters of 4,4'-biphenyldicarboxylic acid and aliphatic glycols are disclosed in journal literature. Polyesters of 4,4'-biphenyldicarboxylic acid and ethylene glycol, 1,4-butanediol, and 1,6-hexanediol are disclosed by Meurisse, et al., in the *British Polymer Journal,* 13, 1981, page 57 (Table 1). Jackson and Morris cite homopolyesters from 4,4'-biphenyldicarboxylic acid and various aliphatic glycols in the *Journal of Applied Polymer Science, Applied Polymer Symposium,* 41, 307–326 (1985). Krigbaum, et al., disclose relatively low molecular weight homopolyesters from 4,4'-biphenyldicarboxylic acid and various aliphatic glycols in the *Journal of Applied Polymer Science, Polymer Letters Edition,* 20, 109–115 (1982).

U.S. Patent No. 4,619,976 discloses a blend of (1) a polyester of terephthalic acid, trans-4,4'-stilbenedicarboxylic acid and 1,4-cyclohexanedimethanol and (2) a polycarbonate.

Art which relates to polyesters derived from stilbenedicarboxylic acid and various glycols, including 1,6-hexanediol includes U.S. Patent Nos. 2,657,195, 3,496,839, 4,420,607, 4,459,402, 4,468,510, and 4,526,822. Other patents of interest include U.S. Nos. 2,657,194, 3,190,174, 3,247,043, 3,842,040, 3,842,041, 4,073,777 and Japanese Kokai 72348/74.

DISCLOSURE OF THE INVENTION

According to the present invention, there are provided blends of (1) about 30–95 weight % of a polyester containing repeating units from at least 80 mol % 4', 4'-biphenyldicarboxylic acid and at least 80 mol % 1,6-hexanediol, based on 100 mol % of an acid component and 100 mol % of a glycol component and having an I.V. of at least 0.9 and (2) about 70–5 weight % of a polycarbonate of 4,4'-isopropylidenediphenol, the I.V. of said polycarbonate being at least 0.3.

The blends according to the present invention provide molding plastics having unexpectedly high tensile strengths. In addition, the blends according to this invention have improved chemical resistance and improved processability.

According to the present invention, the polyester comprises repeating units from at least 80 mol % 4,4'-biphenyldicarboxylic acid and repeating units from at least 80 mol % 1,6-hexanediol, the total mol % of acid components and glycol components each being 100 mol %, and the polyester having an inherent viscosity of at least 0.8, but preferably 1.2 or more determined at 25° C. in 25/35/40 (wt/wt/wt) phenol/tetrachloroethane/p-chlorophenol at a concentration of 0.1 g/100 mL.

The polyesters of this invention are prepared from 4,4'-biphenyldicarboxylic acid and/or its esters, and 1,6-hexanediol. Examples of such useful esters are the dimethyl, diethyl, dibutyl, and diphenyl esters, etc., or any combination of these esters. The polyesters may also be prepared from glycol esters or half-ester/half-acid derivatives of biphenyldicarboxylic acid.

The acid portion of the polyesters may contain minor amounts of other aromatic dicarboxylic acids such as terephthalic acid, isophthalic acid, 1,5-, 1,4-,2,6-, or 2,7-naphthalenedicarboxylic acid, 2-chloroterephthalic acid, 2-methylterephthalic, 2,5-dichloroterephthalic acid, trans-4,4'-stilbenedicarboxylic acid, and the like. The dicarboxylic acid portion of the polymer may also contain minor amounts of aliphatic or cycloaliphatic dicarboxylic acids such as malonic, succinic, glutaric, adipic, pimelic, suberic, azelaic, sebacic, cis- or trans-1,4-cyclohexanedicarboxylic, or dodecanedicarboxylic acid. These polyesters may contain up to about 20 mol % of these other dicarboxylic acids such that the sum of the dicarboxylic acid components is equal to 100 mol %.

The glycol portion of these polymers may contain minor amounts (not exceeding about 20 mol %) of other glycols such that the sum of the glycol components is equal to 100 mol %. Examples of useful glycols are ethylene glycol, 1,4-butanediol, 1,2-propanediol, 1,3-propanediol, 2,2-dimethyl-1,3-propanediol, trans or cis-2,2,4,4-tetramethyl-1,3-cyclobutanediol, 1,5-pentanediol, 1,3- or 1,4-cyclohexanedimethanol, or p-xylenediol.

The polyester portion of the blends may be prepared using conventional techniques well known to those skilled in the art. For example, the references cited herein contain such techniques, and are incorporated herein by reference.

The polycarbonate portion of the blend consists of the polycarbonate of 4,4'-isopropylidenediphenol (bisphenol A). The polycarbonate portion of the blends is prepared in the melt, in solution, or by interfacial polymerization techniques well known in the art.

Many such polycarbonates are commercially available, and are normally made by reacting bisphenol A with phosgene, dibutyl carbonate, diphenyl carbonate, etc. In addition to polycarbonate, poly(estercarbonates) such as Lexan 3250 polycarbonate (General Electric) or polyarylates such as Ardel D100 polyarylate (Amoco) may be used in the blends according to this invention. Conventional additives such as pigments, dyes, stabilizers, plasticizers, etc. may be used in the polyester, polycarbonate and blends according to this invention.

The inherent viscosity of the polyester portion of the blends is at least 0.8 but preferably 1.0 or more. The inherent viscosity of the bisphenol A polycarbonate portion of the blends is at least 0.3 but preferably 0.5 or more.

The polyester/polycarbonate blends may be made by conventional techniques. Pellets of the polyester may be mixed with pellets of the polycarbonate and subsequently melt blended to form a homogeneous mixture.

The blends of this invention may contain antioxidants, conventional flame retardants such as a phosphorus compound, a halogen compound, or a halogen compound in combination with an antimony compound, fillers such as talc or mica, or reinforcing agents such as glass fiber or carbon fiber or Kevlar. [poly(1,4-phenylene terephthalamide)].

The inherent viscosities are determined at 25° C. in 25/35/40 (wt/wt/wt) phenol/tetrachloroethanol/-p-chlorophenol at a concentration of 0.1 g/100 mL.

The examples which follow are submitted for a better understanding of the invention.

The polyester and the polycarbonate are ground to pass a 3-mm screen and dry blended. The dry blends are dried in a vacuum oven at 80°-100° C. and then extruded and pelletized at 280° C. on a ¾-inch Brabender extruder equipped with a screen pack and a mixing screw. The blends are injection-molded on a one-ounce Watson-Stillman molding machine to give 1/16-inch D1822 Type L tensile bars. The tensile strength is determined using ASTM D638 procedures and the average of five breaks is reported in Table 1.

EXAMPLE 1

This example illustrates the preparation of the polyester used in the blends consisting of 100 mol % of 4,4'-biphenyldicarboxylic acid units and 100 mol % 1,6-hexanediol units.

A mixture of 162.0 g (0.60 mol) dimethyl 4,4'-biphenyldicarboxylate, 92.0 g (0.78 mol) 1,6-hexanediol, and a 0.13 g titanium tetraisopropoxide is placed in a 1-liter flask equipped with an inlet for nitrogen, a metal stirrer, and a short distillation column. The flask is heated in a Wood's metal bath at 240° C. for about 1 hour and the temperature is raised to 260° C. for about 30 minutes. A vacuum of 0.6 mm is gradually applied over the next 5 minutes while the temperature is increased to 280° C. Full vacuum is maintained for about 15 minutes at 280° C. A high melt viscosity, opaque polymer is obtained having an I.V. of 1.20.

EXAMPLE 2

This example illustrates the preparation of a 70/30 wt/wt blend of a (BDA) (HD) polyester and bisphenol A polycarbonate.

A dry blend of 210 g of (BDA) (HD) polyester having an I.V. of 1.21 prepared according to a procedure similar to that in Example 1 and 90 g of LEXAN 303 polycarbonate (the polycarbonate from bisphenol A and phosgene) is prepared by roll mixing. The blend is dried, extruded, and pelletized at 280° C. and then injection-molded at 260° C. to give molded bars having a tensile strength of 18,400 psi.

The examples in Table 1 are prepared according to procedures similar to those used in Examples 1 and 2. The bisphenol A polycarbonate used in these examples is LEXAN 303 polycarbonate.

TABLE 1

Tensile Properties of Polycarbonate/Polyester Blends

| Polycarbonate Content, Wt % | Polyester Content, Wt % | Molding I.V. Before | Molding I.V. After | Watson-Stillman[a] Molding Temp., °C. | Watson-Stillman[a] Tensile Str., 10³ psi | Newbury[b] Molding Temp., °C. | Newbury[b] Tensile Str., 10³ psi |
|---|---|---|---|---|---|---|---|
| 100 | 0 | 0.56 | — | 290 | 11.2 | 300 | 12.8 |
| 95 | 5 | 0.70 | 0.61 | 275 | 11.4 | 280 | 11.4 |
| 90 | 10 | 0.68 | 0.65 | 265 | 11.6 | 270 | 11.6 |
| 80 | 20 | 0.66 | 0.62 | — | — | 270 | 11.7 |
| 70 | 30 | 0.88 | 0.87 | 265 | 13.1 | 260 | 10.7 |
| 60 | 40 | 0.83 | 0.80 | 265 | 14.1 | 265 | 15.3 |
| 50 | 50 | 1.06 | 0.94 | 265 | 17.8 | 260 | 17.9 |
| 30 | 70 | 1.21 | 1.15 | 260 | 18.4 | 250 | 25.5 |
| 10 | 90 | 1.38 | 1.38 | 260 | 15.7 | 250 | 17.2 |
| 5 | 95 | 1.18 | 1.27 | 260 | 12.8 | 250 | 20.0 |
| 0 | 100 | 1.01 | 1.00 | 260 | 7.7[c] | 260 | 11.7 |
| 0 | 100 | 1.14 | 1.11 | — | — | 210 | 11.3[d] |

[a]These compositions are injection-molded on a 1-oz Watson-Stillman molding machine.
[b]These compositions are injection-molded on a ¾-oz Newbury molding machine.
[c]The homopolyester of BDA and HD was molded at the lowest temperature which can be used for the blends to try to obtain the maximum orientation and thus the maximum tensile properties.
[d]This polymer is disclosed by Meurisse in the Brit. Poly. J., Vol 13, p 57 (1981). It has an I.V. of 1.14. The polyester is molded on a ¾-ounce Boy 22S molding machine at the lowest possible temperature to obtain maximum orientation, and therefore maximum tensile strength, in the molded bar.

While the invention has been described in detail with particular reference to preferred embodiments thereof, it will be understood that variations and modifications can be effected within the spirit and scope of the invention.

We claim:

1. Composition of matter having a tensile strength of at least 13,000 psi comprising a blend of
   (a) about 30–95 weight % of a polyester containing repeating units from at least 80 mol % biphenyldicarboxylic acid and at least 80 mol % 1,6-hexanediol, based on 100 mol % of an acid component and 100 mol % of a glycol component and having an I.V. of at least 0.8 and
   (b) about 70–5 weight % of a polycarbonate of 4,4'-isopropylidenediphenol having an I.V. of at least 0.3.

2. Composition of claim 1 having an I.V of at least 0.8.

3. Composition according to claim 1 comprising about 60–90 weight % polyester and about 40–10 weight % polycarbonate.

4. Composition according to claim 1 wherein said polyester consists essentially of repeating units from biphenyldicarboxylic acid and 1,6-hexanediol.

5. Composition of matter comprising a blend of
   (a) about 60–90 weight % of a polyester consisting essentially of repeating units from biphenyldicarboxylic acid and 1,6-hexanediol having an I.V. of at least 0.8, and
   (b) about 40–10 weight % of a polycarbonate of 4,4'-isopropylidenediphenol, having an I.V. of at least 0.3.

6. A composition of claim 5 wherein said polyester has an I.V. of at least 1.0 and said polycarbonate has an I.V. of at least 0.5.

7. A fiber comprising the blend of claim 1.
8. A film comprising the blend of claim 1.
9. A container comprising the blend of claim 1.
10. A molded object comprising the blend of claim 1.

* * * * *